United States Patent [19]

Ichinoi

[11] Patent Number: 4,768,094
[45] Date of Patent: Aug. 30, 1988

[54] NOISE SUPPRESSING CIRCUIT WITH GAIN CONTROL

[75] Inventor: Yutaka Ichinoi, Yokohama, Japan

[73] Assignee: Victor Company of Japan, Ltd., Yokohama, Japan

[21] Appl. No.: 902,842

[22] Filed: Sep. 2, 1986

[30] Foreign Application Priority Data

Aug. 30, 1985 [JP] Japan .................. 60-192343

[51] Int. Cl.⁴ .............................................. H04N 5/21
[52] U.S. Cl. .................................. 358/167; 358/340
[58] Field of Search ................. 358/167, 36, 336, 340, 358/342

[56] References Cited

U.S. PATENT DOCUMENTS 4,302,768 11/1981 Kamura ......................... 358/167
4,563,704 1/1986 Hirota ........................... 358/167

FOREIGN PATENT DOCUMENTS 57-210405 12/1982 Japan .
57-211885 12/1982 Japan .
54579 3/1985 Japan ...................... 358/36

Primary Examiner—Tommy P. Chin
Attorney, Agent, or Firm—Pollock, VandeSande & Priddy

[57] ABSTRACT

To suppress noise included in a video signal, the noise level is detected by a noise level detecting circuit which operates only within blanking period; and the noise level is suppressed through control of a gain control circuit in accordance with an output signal from the noise level detecting circuit. The gain control circuit may be a voltage controlled variable gain amplifier interposed between a limiter and a subtractor of an in-line noise supressing circuit. A vertical correlation noise canceller may also be combined so that a gain control circuit interposed between a limiter and a subtractor is also controlled.

15 Claims, 9 Drawing Sheets

FIG. 5
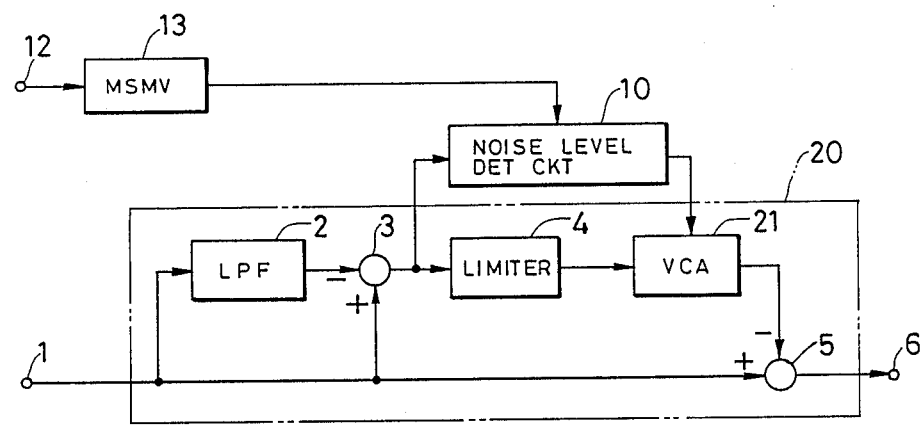
FIG. 8A
FIG. 8B
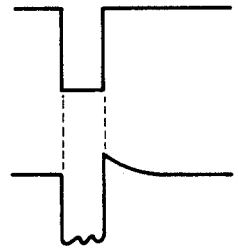

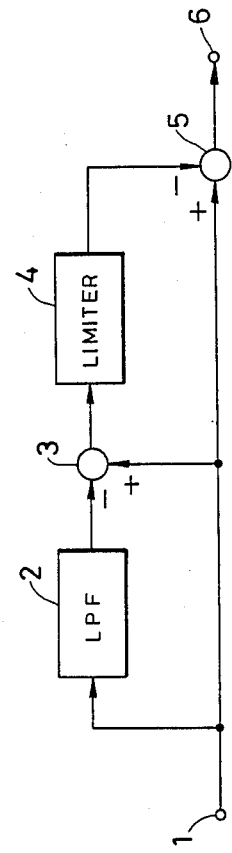
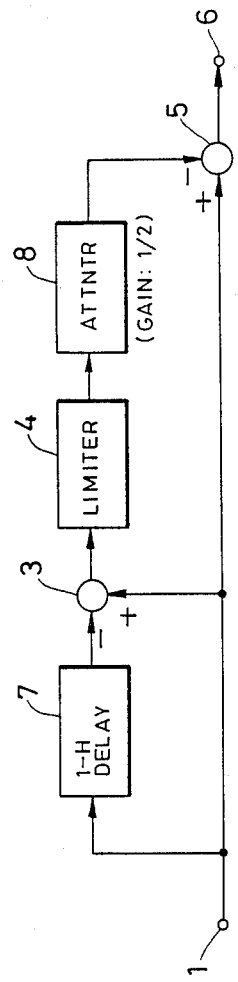

NOISE SUPPRESSING CIRCUIT WITH GAIN CONTROL

BACKGROUND OF THE INVENTION

1. Field of the Invention

This invention relates to a noise suppressing circuit, and particularly to a circuit for deriving a video signal with noise being suppressed in a video signal recording-/reproducing apparatus such as a video tape recorder or the like.

2. Description of the Prior Art

Various types of noise suppressing circuits are known which are used for suppressing noise included in a video signal. FIG. 11 and FIG. 12 show conventional noise suppressing circuits used for suppressing noise included in a video signal processed in a reproducing system such as a video tape recorder.

In a circuit of FIG. 11, high frequency components are derived by a circuit comprising a low pass filter 2 and a subtractor 3 from a video signal incoming through a terminal 1. Then amplitude is limited by a limiter 4 to derive high frequency small-amplitude components of the video signal. These components are regarded the same as noise and are subtracted from the input video signal by way of a subtractor 5. As a result, a video signal whose noise has been suppressed is outputted through a terminal 6. Since this circuit performs noise suppression using information within one horizontal scanning period, this circuit will be referred to as an in-line noise suppressing circuit.

On the other hand, in a circuit of FIG. 12, vertical high frequency components of a video signal incoming through an input terminal 1 are obtained by 1-H delay circuit 7 and a subtractor 3, and noise is obtained ty limiting amplitude by a limiter 4 and an attenuator having a gain of approximately ½. This noise is subtracted from the input video signal by a subtractor 5 to obtain a video signal whose noise has been suppressed. Since this circuit performs noise suppression using the fact that a video signal has vertical correlation (correlation between two points which are spaced 1-H period), this circuit will be referred to as a vertical correlation noise canceller.

The noise suppressing effect by these noise suppressing circuits is determined by the passing level of the limiter 4 and by the level of the output from the limiter 4 which is to be subtracted from the input video signal, and the noise suppressing effect will increase as the passing level of the limiter 4 is made larger and larger.

The in-line noise suppressing circuit shown in FIG. 11 exhibits maximum noise suppressing effect when the gain of the limiter output and the gain of the input video signal are set as in a ratio of 1 to 1, i.e., a limiter output of 1 to an input videl signal of 1=. However, there occurs an unfavorable side effect that the small-amplitude details of the incoming video signal are lost. Furthermore, the vertical correlation noise canceller shown in FIG. 12 exhibits maximum noise suppressing effect when the gain of the limiter output and the gain of the input video signal are set as a ratio of (limiter output) (input video signal)=½: 1. However, this causes vertical signal components to be lost, and thus there occurs the unfavorable side effect that the picture is blurred in a vertical direction.

Therefore, in the conventional circuits the passing level of the above-mentioned limiter and the level of the limiter output to be subtracted from the input video signal are set in consideration of the balance with respect to the SN ratio of the video signal.

The recent development of magnetic tapes is remarkable, and various types have been developed whose SN ratio has been improved compared to conventional standard magnetic tapes. However, since the above-mentioned conventional circuits are arranged such that limiter level and limiter output gain are fixed irrespective of the SN ratio of the input video signal, when designing a video deck, the above-mentioned setting is performed so that satisfactory SN ratio is obtained when reproducing a standard tape.

In conventional video decks, there is a drawback that it is difficult to obtain high quality pictures by using high quality magnetic tape since the unfavorable side effects of dropout of the details of the small-amplitude input video signal and blur in vertical direction remain unchanged even if SN ratio is good enough when reproducing such a high quality magnetic tape.

In addition, there is a drawback that when using conventional circuits, the poor SN ratio will appear on the screen as it is in the case of poor SN ratio of the recorded video signal caused by incorrect tracking in the reproduce mode or by radio wave receiving state or the like.

SUMMARY OF THE INVENTION

The present invention has been developed in order to remove the above-described drawbacks inherent in the conventional noise suppressing circuits and contemplates to provide a noise suppressing circuit which does not lose details of small-amplitude input video signals and which is capable of preventing vertical blur of images with the structure that noise suppressing effect is variable in accordance with the magnitude of the noise level.

It is, therefore, an object of the present invention to provide a new and useful noise suppressing circuit which is capable of effectively suppressing noise without destroying details of small-amplitude video signal, thus improving picture quality.

According to a feature of the present invention, noise level is detected within blanking period by a noise level detecting circuit, and the level of extracted high frequency small-amplitude components is controlled by controlling the gain of a variable gain amplifier provided to an in-line noise suppressing circuit in accordance with the magnitude of the detected noise level.

In accordance with the present invention there is provided a noise suppressing circuit for a video signal, comprising: a switching signal generating means for generating a switching signal in response to a sync signal derived from the video signal; noise level detecting means responsive to said switching signal for detecting magnitude of noise included in said video signal within blanking period; and noise subtracting means for obtaining small-amplitude components of said video signal and for subtracting said small-amplitude components from said video signal; and means incorporated with said noise subtracting means for controlling magnitude of said small-amplitude components in accordance with an output signal from said noise level detecting means before said small-amplitude components are subtracted from said video signal.

In accordance with the present invention there is also provided a noise suppressing circuit for a video signal, comprising: a switching signal generating means for generating a switching signal in response to a sync signal derived from the video signal; noise level detecting means responsive to said switching signal for detecting magnitude of noise included in said video signal within blanking period; and a vertical correlation noise canceller for obtaining small-amplitude components of said video signal through detecting vertical correlation and for subtracting said small-amplitude components from said video signal; an in-line noise suppressing circuit for obtaining high frequency small-amplitude components included in an output signal from said vertical correlation noise canceller and for subtracting said high frequency small-amplitude components from said output signal from said vertical correlation noise canceller; and means for controlling magnitude of said small-amplitude components in said vertical correlation noise canceller and in said in-line noise suppressing circuit in accordance with an output signal from said noise level detecting means.

In accordance with the present invention there is further provided a noise suppressing circuit for a video signal, comprising: a switching signal generating means for generating a switching signal in response to a sync signal derived from the video signal; a first subtractor responsive to said video signal and an output signal of a coefficient setting circuit; a 1-H delay circuit responsive to an output signal from said first subtractor; a second subtractor responsive to an output signal from said 1-H delay circuit and to said video signal; a limiter responsive to an output signal from said second subtractor, an output signal of said limiter being fed to an input of said coefficient setting circuit; noise level detecting means responsive to said switching signal for detecting magnitude of noise included in said output signal from said second subtractor within blanking period; means for controlling magnitude of said output signal from said limiter in accordance with an output signal from said noise level detecting means; and a third subtractor responsive to an output signal from said magnitude controlling means and to said video signal for producing an output video signal.

BRIEF DESCRIPTION OF THE DRAWINGS

The object and features of the present invention will become more readily apparent from the following detailed description of the preferred embodiments taken in conjunction with the accompanying drawings in which:

FIGS. 5 to 7 are block diagrams of second to fourth embodiments of the present invention;

FIGS. 8A and 8B are explanatory diagrams for the description of the deformation of the waveform around horizontal sync signal;

FIGS. 11 and 12 are block diagrams of respective examples of conventional circuits.

The same or corresponding elements and parts are designated at like reference numerals throughout the drawings.

DETAILED DESCRIPTION OF THE INVENTION

Figure 1:
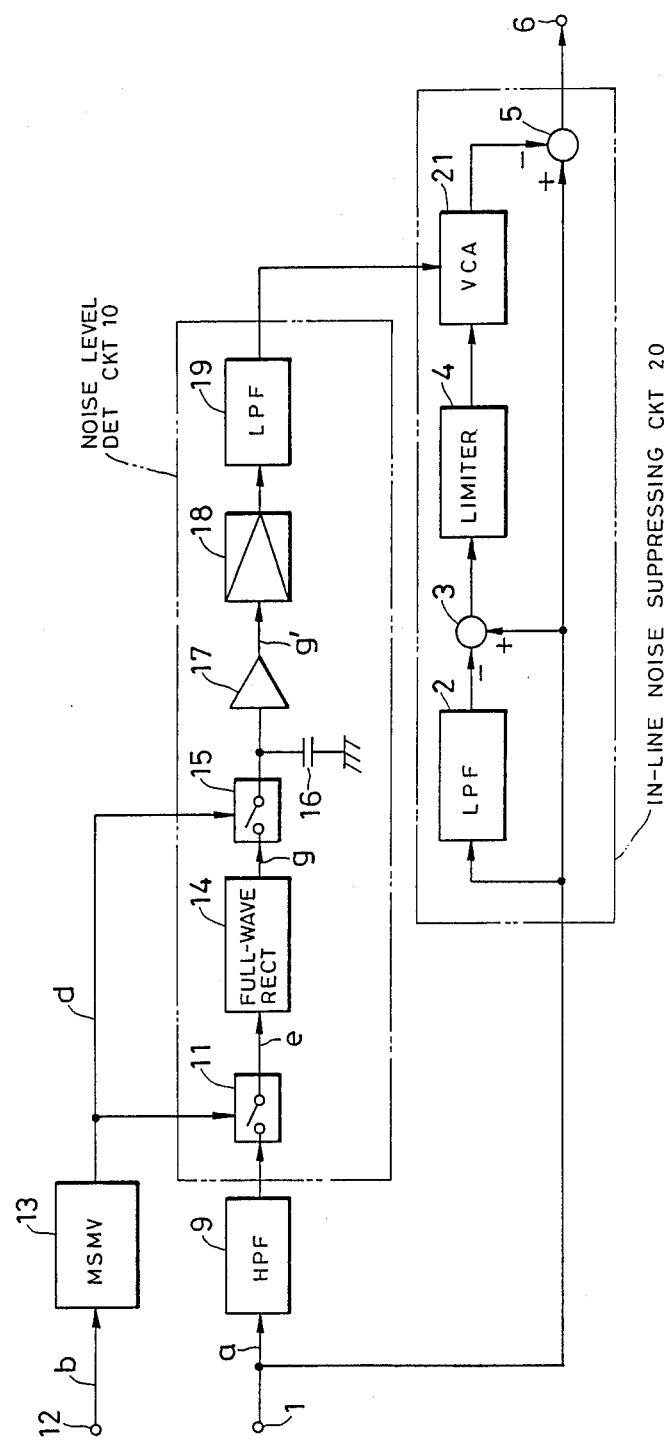
FIG. 1 is a block diagram of a first embodiment of the present invention.

Referring to FIG. 1, a schematic block diagram of a first embodiment of a noise suppressing circuit according to the present invention is shown. The noise suppressing circuit of FIG. 1 generally comprises a monostable multivibrator 13, a high pass filter 9, a noise level detecting circuit 10, and an in-line noise suppressing circuit 20. More specifically, the noise level detecting circuit 10 comprises first and second switching circuits 11 and 15, a full-wave rectifier 14, a buffer amplifier 17, a d.c. amplifier 18, a low pass filter 19 and a capacitor 16. The in-line noise suppressing circuit 20 comprises a low pass filter 2, first and second subtractors 3 and 5, a limiter 4 and a voltage controlled variable gain amplifier (VCA) 21.

Figure 2A:
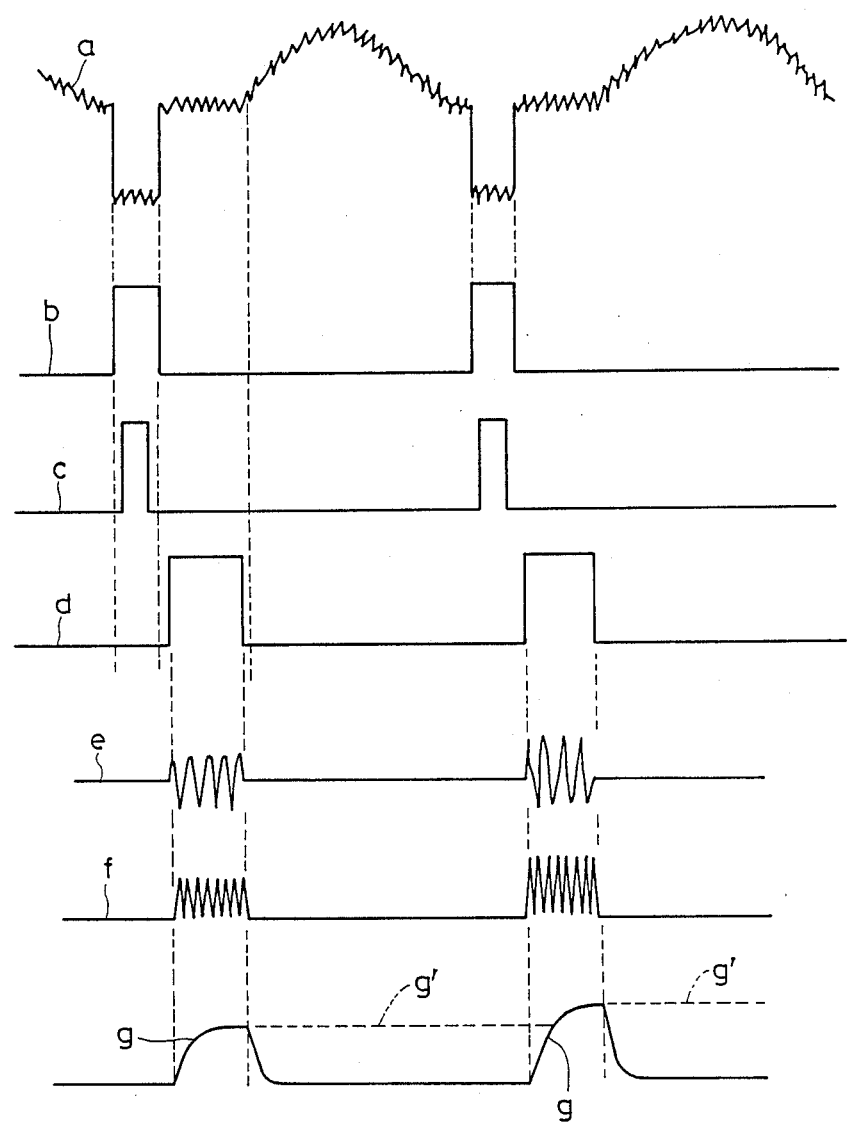
FIGS. 2A and 2B are waveform charts for the description of the operation of the first embodiment of FIG. 1.

In FIG. 1, a video signal "a" (see FIG. 2A) coming into a terminal 1 is fed to the first switching circuit 11 with d.c. components being removed by the high pass filter 9. On the other hand, a sync signal "b" (see also FIG. 2A) fed to a terminal 12 is turned to a switching control signal "d" (see also FIG. 2A) having pulse width within a back porch period, for instance by the monostable multivibrator 13; and this switching control signal is fed to the switching circuit 11 to extract the output signal from the high pass filter 9 for this period. Thus, noise "e" (see also FIG. 2A) showing enlarged waveform of noise included in the top waveform in FIG. 2A is taken out of the first switching circuit 11 to be fed to the full-wave rectifier 14 having a structure shown in FIG. 3. Here, in place of obtaining the switching control signal "d" by the monostable multivibrator 13, a switching control signal "c" having a pulse width within sync signal tip period may be obtained (see also FIG. 2A). Since the video signal within the above-mentioned back porch period and sync signal tip period has constant level at the beginning, only the above-mentioned noise components "e" are extracted. In the above, the sync signal "b" is a horizontal sync signal of the video signal "a" in this embodiment, and this horizontal sync signal "b" is separated from the video signal "a" in advance by way of an unshown sync separator. The monostable multivibrator 13 actually includes a delay circuit or an additional monostable multivibrator, in addition to the single monostable multivibrator, so as to produce the switching control signal "d" in response to the sync signal "b".

Hereinbelow will be described a case where the switching control signal "d" within back porch period is used.

Figure 3:
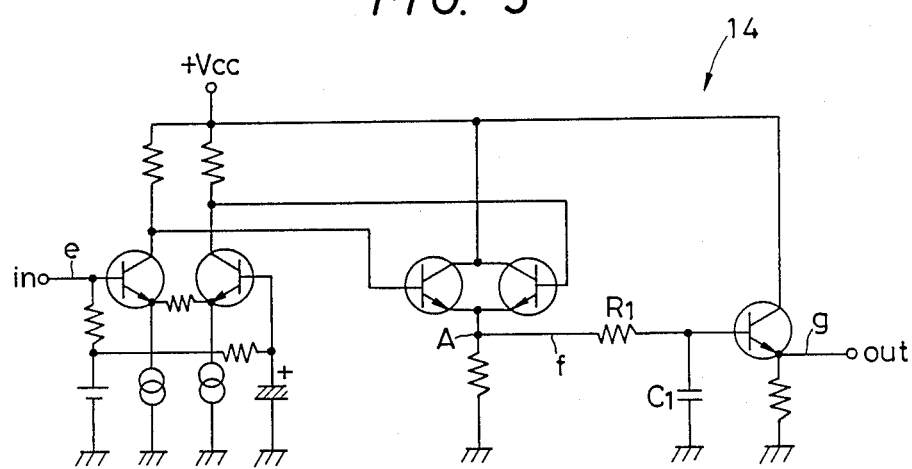
FIGS. 3 and 4 are detailed circuit diagrams respectively showing some parts of the circuit shown in FIG. 1.

Noise "e" is full-wave rectified by the full-wave rectifier 14 so that a full-wave rectified signal "f" (see FIG. 2A) is taken from a point A of a circuit shown in FIG. 3, and this signal is turned to a signal "g" (see a solid curve designated at "g" in FIG. 2A) by a low pass filter comprising a resistor R1 and a capacitor C1. This signal "g" is fed to the second switching circuit 15 to be sampled for pulse width period of the signal "d", and the peak value thereof is held by the capacitor 16 to be turned to a signal "g'" (see dotted line in the waveform of signal "g") by the buffer amplifier 17.

Figure 4:
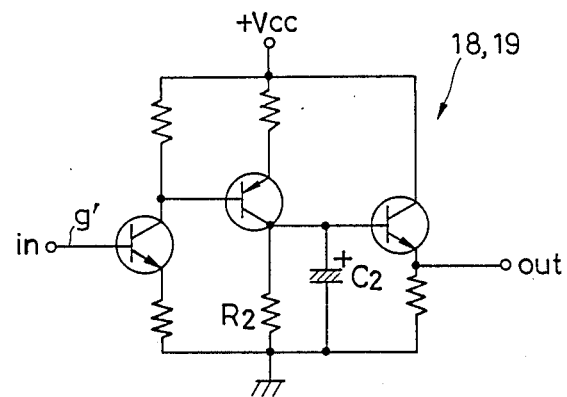

The signal "g'" is fed to the d.c. amplifier 18 whose structure is shown in FIG. 4 and to the low pass filter 19 to be d.c. amplified and smoothed so as to be turned to a noise level detection signal corresponding to the level of the noise components included in the video signal. This signal is then fed to a voltage controlled variable gain amplifier (VCA) 21 within the in-line noise suppressing circuit 20. The low pass filter 19 has a cutoff frequency which is much smaller than the horizontal scanning frequency, and if the resistor R2=2.2 kohms, capacitor C2=100 microF, the cutoff frequency would be 0.72 Hz so as to perform smoothing in an adequate manner.

On the other hand, a video signal "a" is fed to the low pass filter 2, subtractor 3 and limiter 4 of the in-line noise suppressing circuit 20 so that noise components are extracted in the same manner as in the above-mentioned conventional circuits before being fed to the VCA 21. The gain of the VCA 21 is controlled by the noise level detection signal from the noise level detecting circuit 10, and thus the gain of output of the limiter 4 is varied in accordance with the noise level to be fed to the subtractor 5.

Here, when the noise level is low, the gain of the VCA 21 is made smaller by the noise level detection signal from the noise level detection circuit 10, and the level of the limiter output to be subtracted from the input video signal by the subtractor 5 is made smaller. As a result, the amount of details of images of small-amplitude to be lost is reduced to reproduce images faithfully, although the effect of SN ratio improvement is reduced.

On the other hand, when noise level is high, the gain of the VCA 21 is made larger by the noise level detection signal from the noise level detection circuit 10, and the level of the limiter output to be subtracted from the input video signal by the subtractor 5 is made larger (i.e. two inputs to the subtractor 5 are set to be close to 1:1). As a result, sufficient SN ratio improvement is obtained.

Figure 2B:
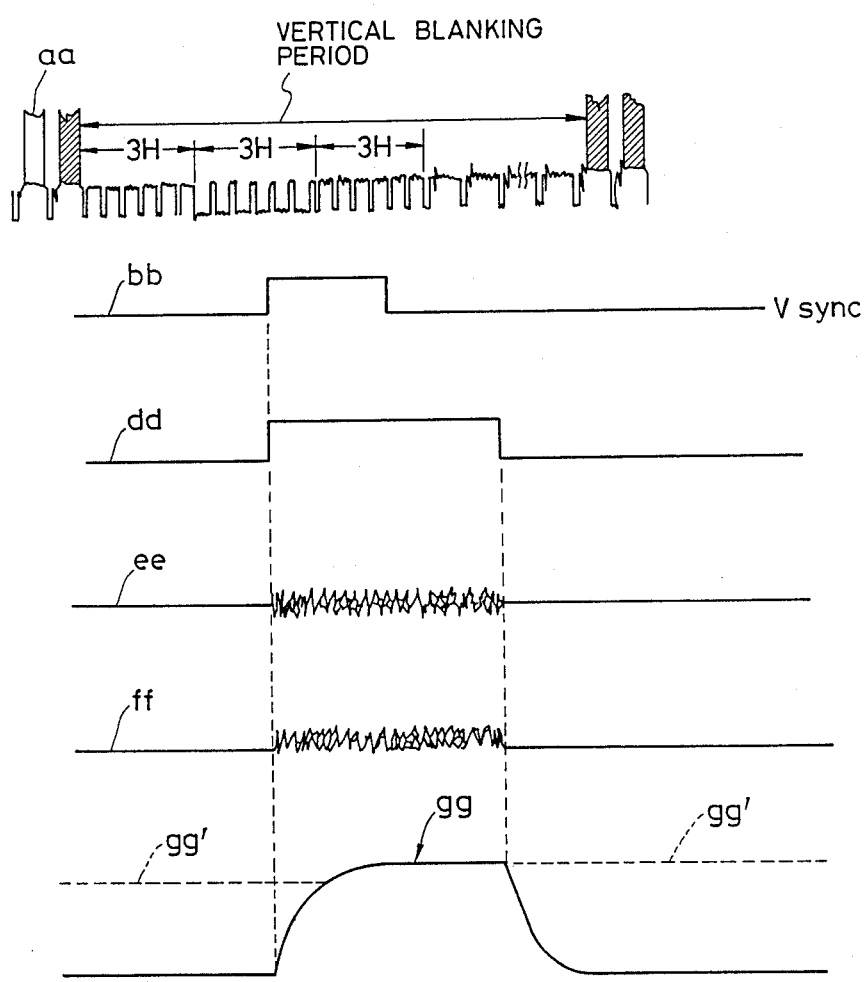

In the above-described first embodiment, the sync signal fed to the terminal 12 is a horizontal sync signal of a composite video signal as shown in FIG. 2A. However, the present invention may be applied to circuit arrangement in which noise level is detected using noise level within vertical blanking period. In other words, when a vertical sync signal is applied to the terminal 12 of the circuit of FIG. 1, the noise level detecting circuit 10 detects the level of noise in the vertical blanking period rather than the horizontal blanking period. FIG. 2B is a waveform chart useful for understanding how the noise level in vertical blanking period is detected. In FIG. 2B, waveforms aa, bb, dd, ee, ff, gg, and gg' respectively correspond to the waveforms a, b, d, e, f, g and g' in FIG. 2A. It is to be noted that although the present invention is described mainly in connection with horizontal blanking period as period where noise level is detected, the present invention may also be applied to an arrangement where noise level in vertical blanking period is detected.

In the above-described first embodiment of FIG. 1, the output signal of the noise level detecting circuit 10 is fed to the VCA 21 included in the in-line noise suppressing cicuit 20. However, the in-line noise suppressing circuit 20 of FIG. 1 may be replaced witt a vertical correlation noise canceller including a VCA. More specifically, the low pass filter 2 of the in-line noise suppressing circuit 20 may be replaced with a 1-H delay circuit so as to constitute a vertical correlation noise canceller.

FIG. 5 shows a block diagram of a second embodiment of the present invention circuit. In this diagram those parts which are the same as those in FIG. 1 are designated with the same numerals and description thereof is omitted. In this circuit, a high pass filter constructed of a low pass filter 2 and a subtractor 3, which are inherent in the in-line noise suppressing, is used to function as the high pass filter 9 of FIG. 1 which is necessary for the input of the noise level detecting circuit 10. With this circuit, the circuit configuration can be simplified.

Figure 6:
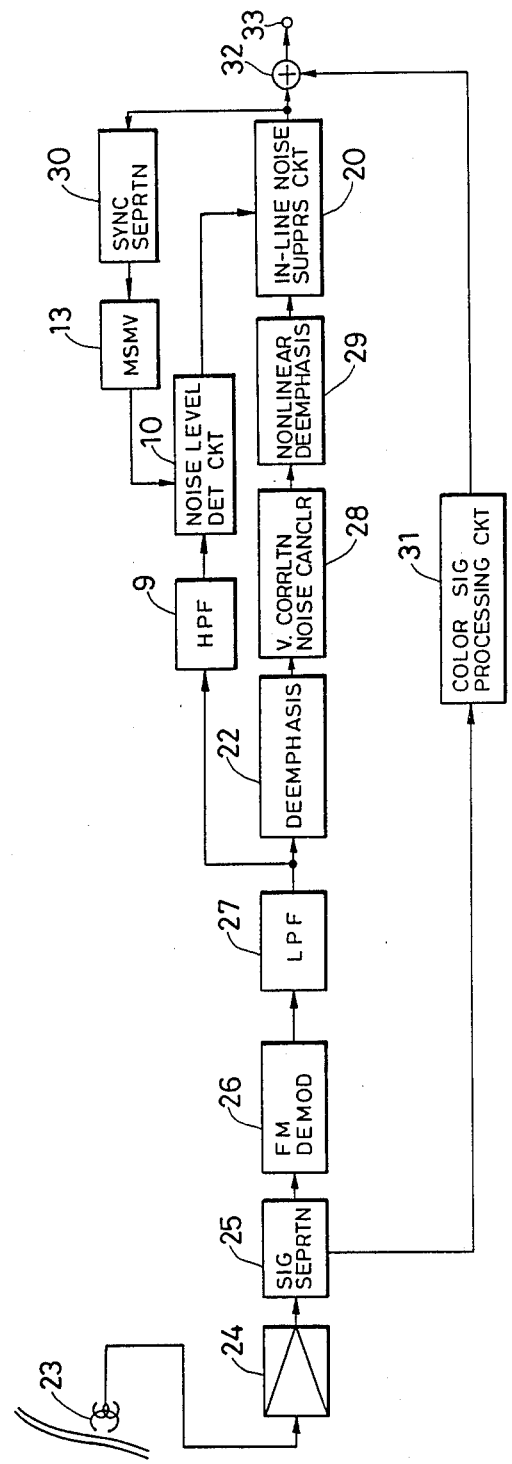

FIG. 6 shows a block diagram of a third embodiment of the present invention circuit. In this diagram those parts which are the same as those in FIG. 1 are designated with the same numerals and description thereof is omitted. This circuit is arranged such that in a reproduce circuit of a video tape recorder, a signal necessary for noise detection is extracted from the input of a deemphasis circuit 22.

In this diagram, a signal reproduced by a magnetic head 23 is fed to a signal separation circuit 25 in which luminance signal and color signal are separated, and the luminance signal is fed via an FM demodulator 26 and a low pass filter 27 to a high pass filter 9 and a deemphasis circuit 22. An output signal from the deemphasis circuit 22 is fed via a vertical correlation noise canceller 28 and a non-linear deemphasis circuit 29 to an in-line noise suppressing circuit 20 in which noise suppression is performed in the same manner as in the previous embodiments. Here, the output from the in-line noise suppressing circuit 20 is fed to a sync separating circuit 30 in which the sync signal is separated and then fed to a monostable multivibrator 13.

On the other hand, the color signal is processed in a color signal processing circuit 31 in a well known manner to be added to the luminance signal by an adder 32, and an added signal is taken out of an output terminal 33.

In this circuit, since a signal necessary for noise level detection is obtained at a stage before the high frequency components are attenuated by the deemphasis circuit 22, it is possible to extract high level noise; thus, advantageously detection of the same is easy.

Figure 7:
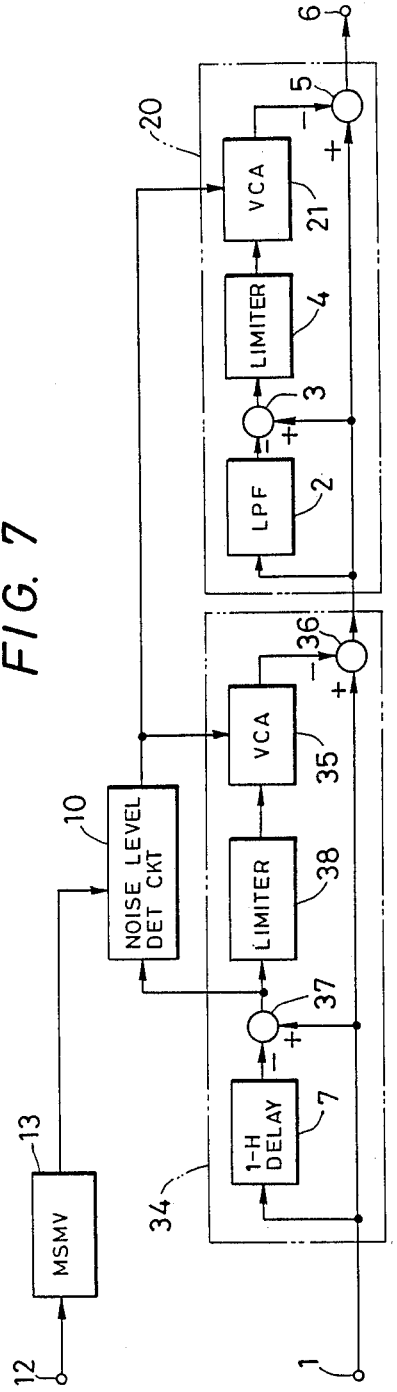

FIG. 7 shows a block diagram of a fourth embodiment of the present invention circuit. In this diagram those parts which are the same as those in FIG. 1 are designated with the same numerals and description thereof is omitted. This circuit is arranged such that a VCA 35 provided in the vertical correlation noise canceller 34 and a VCA 21 provided in the in-line noise suppressing circuit 20 are controlled by the noise level detection circuit 10. Since a signal of a portion within a horizontal blanking period is constant over respective lines, only noise components are taken out of the subtractor 37 of the vertical correlation noise canceller 34 with d.c. components and signal components being cancelled. Therefore, there is no need of providing a high pass filter before the noise level detection circuit 10.

The waveform around the horizontal sync signal is shown in FIG. 8A, and this waveform is sometimes deformed as in FIG. 8B due to the characteristic of a signal processing system when reproducing by a home-use video tape recorder. In this case, there occurs a disadvantage that erroneous control would occur because of the above-mentioned deformation as noise, in the embodiment of obtaining noise level using the signal "c" shown in FIG. 2A. Since this deformation does not change over respective lines, the above-mentioned disadvantage would not occur with only noise components being extracted by cancelling the above-mentioned deformation if difference from a previous signal 1-H is derived by a subtractor 37 as in the fourth embodiment shown in FIG. 7.

Furthermore, in the fourth embodiment, since the above-mentioned deformation is cancelled, there is an advantage that influence of rising waveform following a sync signal shown in FIG. 8B is not taken out even if switching is performed in a long period of time including the rising portion following sync signal by the switching circuit 11 (see FIG. 1) of the noise level detection circuit 10.

Figure 9:
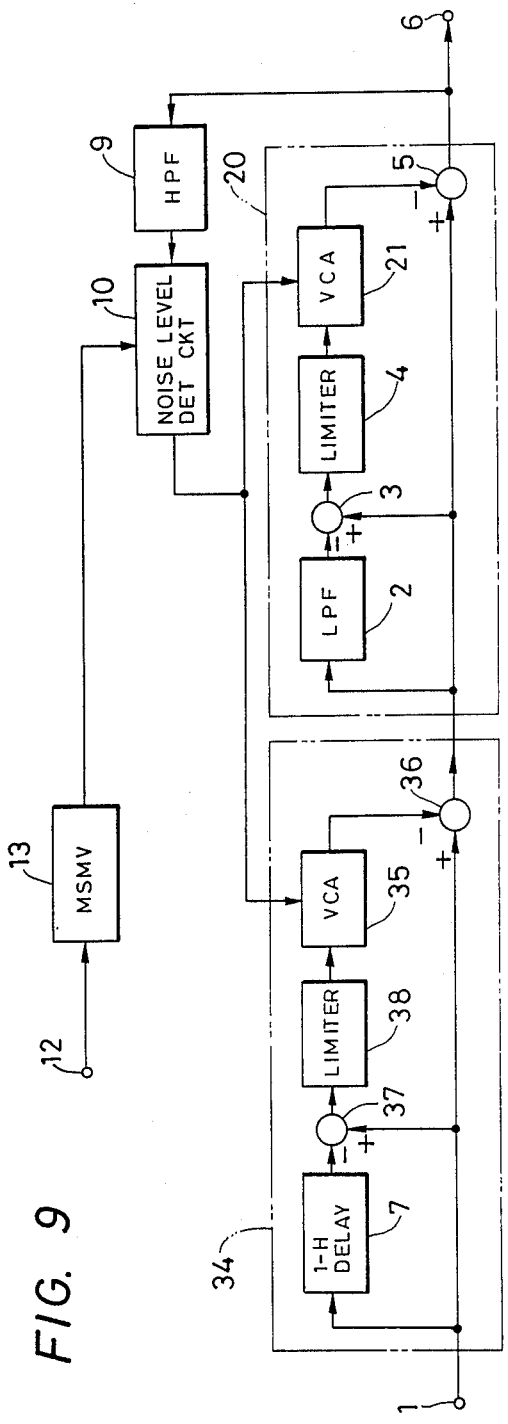
FIGS. 9 and 10 are block diagrams of fifth and sixth embodiments of the present invention.

FIG. 9 shows a block diagram of a fifth embodiment of the present invention circuit. In this diagram those parts which are the same as those in FIGS. 1 and 7 are designated with the same numerals and description thereof is omitted. This circuit is arranged such that an output signal from the in-line noise suppressing circuit 20 is used as the signal necessary for noise level detection, and SN ratio improving amount of the in-line noise suppressing circuit 20 and the vertical correlation noise canceller 34 is controlled so that SN ratio at the output 20 is constant.

Figure 10:
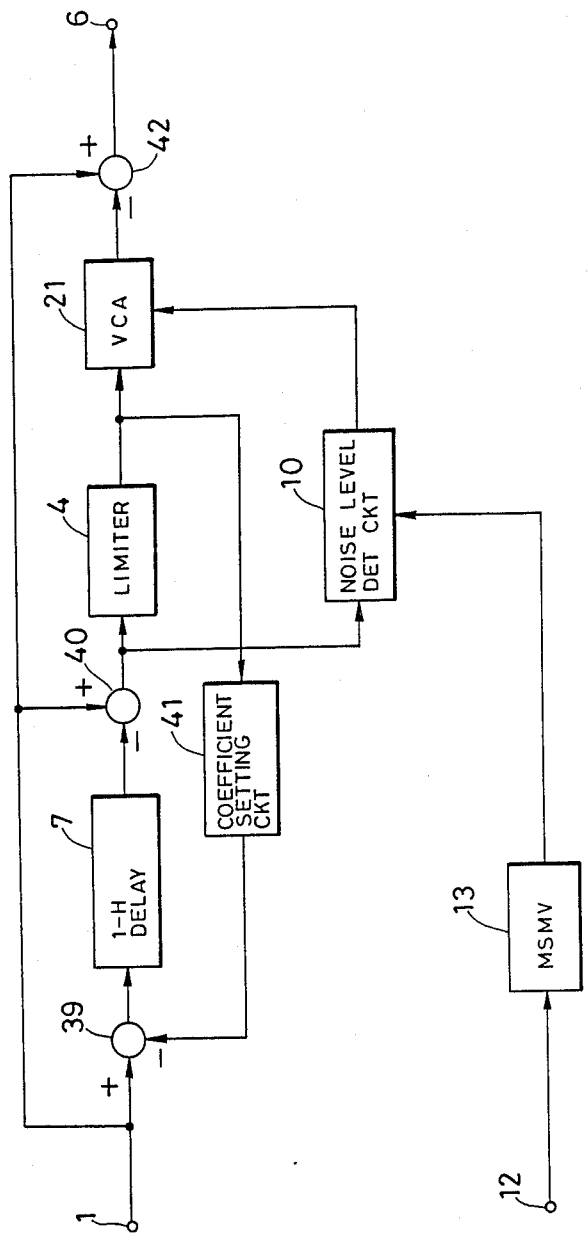

FIG. 10 shows a block diagram of a sixth embodiment of the present invention circuit. In this diagram those parts which are the same as those in FIG. 1 are designated at the same numerals and description thereof is omitted. This circuit is one adapted to a circuit proposed by the assignee of the present invention in Japanese Patent Application No. 60-59096 (Title of the Invention: Luminance signal reproducing apparatus and recording/reproducing apparatus, filed Mar. 23, 1985 but not yet published).

In this diagram, an output signal of a feedback type comb filter comprising subtractors 39 and 40, 1-H delay circuit 7, a limiter 4 and a coefficient setting circuit 41 is fed to the VCA 21 to control the gain of the VCA 21 by the output of the noise level detecting circuit 10 and the output signal from the VCA 21 is subtracted from the input video signal by the subtractor 42 to derive an output signal from a terminal 6. This embodiment has an effect that vertical resolution in the above-mentioned proposed apparatus is improved in addition to the effect of the above-mentioned first embodiment.

Moreover, this embodiment may be applied to a circuit proposed by the assignee of the present invention in Japanese Patent Application No. 60-59098 (Title of the Invention: Luminance signal reproducing apparatus and recording/reproducing apparatus, filed Mar. 23, 1985 but not yet published). This circuit utilizes Δt delay circuit which delays by a short period of time, which is much shorter than 1-H, in place of using the 1-H delay circuit 7 of FIG. 10. In addition to having those effects of the above-mentioned first embodiment, the circuit has an effect of reducing smear immediately after the edge of a large-amplitude input signal and reducing noise which is inherent.

The present invention is not limited to the above-described embodiments, and may be applicable to noise suppressing circuits using a field memory or frame memory.

According to the present invention, since the noise suppressing effect is varied in accordance with the magnitude of noise level, the noise suppression amount can be increased when the noise level is high. As a result, when the present invention is adapted to an in-line noise suppressing circuit, the drop out of details of small-amplitude input video signal is prevented; and when the present invention is applied to vertical correlation noise canceller, vertical image blur can be prevented because no vertical signal components are lost. Thus the present invention has an advantage that the image quality can be improved compared to conventional circuits.

The above-described embodiments are just examples of the present invention, and therefore, it will be apparent for those skilled in the art that many modifications and variations may be made without departing from the scope of the present invention.

What is claimed is:

1. A noise suppressing circuit for a video signal, comprising:
   (a) a switching signal generating means for generating a switching signal in response to a sync signal derived from the video signal;
   (b) noise level detecting means responsive to said switching signal for detecting magnitude of noise included in said video signal within a blanking period;
   (c) noise subtracting means having an in-line noise suppressing circuit including a low pass filter, a first subtractor for subtracting the output of said low pass filter from said video signal, and a limiter coupled to said first subtractor, for obtaining high frequency small amplitude components of said video signal, and further having a second subtractor for subtracting said high frequency small-amplitude components from said video signal to produce a noise-suppressed output video signal; and
   (d) means incorporated with said noise subtracting means for controlling magnitude of said high frequnecy small-amplitude components in accordance with an output signal from said noise level detecting means before said high frequency small-amplitude components are subtracted from said video signal thereby producing said noise-suppressed output video signal.

2. A noise suppressing circuit as claimed in claim 1, wherein said noise level detecting means comprises a switching circuit responsive to said switching signal for deriving noise components within said blanking period, a full-wave rectifying circuit for performing full-wave rectification of an output from said switching circuit, a sample-and-hold circuit for sampling and holding an output from said full-wave rectifying circuit, and a second low pass filter for smoothing an output from said sample-and-hold circuit to provide said output signal.

3. A noise suppressing circuit as claimed in claim 1, wherein said in-line noise suppressing circuit comprises said low pass filter responsive to said video signal, said first subtractor responsive to said video signal and to an output signal from said low pass filter for subtracting the output of said low pass filter from said video signal, said limiter responsive to an output signal from said first subtractor and said limiter being coupled to said first subtractor, and said second subtractor responsive to said video signal and to an output signal of said high frequency small amplitude component from said limiter thereby producing said noise-suppressed output video signal, and wherein said magnitude controlling means comprises a voltage controlled variable gain amplifier interposed between said limiter and said second subtractor.

4. A noise suppressing circuit as claimed in claim 3, wherein said noise level detecting circuit is arranged to receive said output signal from said first subtractor.

5. A noise suppressing circuit as claimed in claim 1, further comprising a sync separator responsive to said noise-suppressed output video signal from said in-line noise suppressing circuit for separating a horizontal sync signal as said sync signal fed to said switching signal generating means.

6. A noise suppressing circuit as claimed in claim 1, further comprising a sync separator responsive to an said noise-suppressed output video signal from said in-line noise suppressing circuit for separating a vertical sync signal as said sync signal fed to said switching signal generating means.

7. A noise suppressing circuit for a video signal, comprising:
(a) a switching signal generating means for generating a switching signal in response to a sync signal derived from the video signal;
(b) noise level detecting means responsive to said switching signal for detecting magnitude of noise included in said video signal within a blanking period;
(c) a vertical correlation noise canceller comprising a 1-H delay circuit responsive to said video signal, a first subtractor responsive to said video signal and to an output from said 1-H delay circuit, a first limiter responsive to an output signal from said first subtractor, and a second subtractor responsive to said video signal and to an output signal from said first limiter thereby producing an output signal from said noise canceller, for obtaining high frequency small-amplitude components of said video signal through detecting vertical correlation and for subtracting said high frequency small-amplitude components from said video signal;
(d) an in-line noise suppressing circuit having a low pass filter responsive to said output signal from said vertical correlation noise canceller, a third subtractor responsive to said output signal from said vertical correlation noise canceller and to an output signal from said low pass filter, a second limiter responsive to an output signal from said third subtractor in said in-line noise suppressing circuit, and a fourth subtractor responsive to said output signal from said vertical correlation noise canceller and to an output signal from said second limiter in said in-line noise suppressing circuit to produce a noise-suppressed output video signal, for obtaining high frequency small-amplitude components included in said output signal from said vertical correlation noise canceller and for subtracting said high frequency small-amplitude components from said limiter in said in-line suppressing circuit from said output signal from said vertical correlation noise canceller to provide said noise-suppressed output video signal; and
(e) magnitude controlling means having a voltage-controlled variable gain amplifier interposed between said first and said limiters and said second and fourth subtractors, for controlling magnitude of said respective high frequency small-amplitude components, respectively in said vertical correlation noise canceller and in said in-line noise suppressing circuit in accordance with an output signal from said noise level detecting means.

8. A noise suppressing circuit as claimed in claim 7, wherein said noise level detecting means comprises a switching circuit responsive to said switching signal for deriving noise components included in said video signal within a blanking period, a full-wave rectifying circuit for performing full-wave rectification of an output from said switching circuit, a sample-and-hold circuit for sampling and holding an output from said full-wave rectifying circuit and a second low pass filter for smoothing an output from said sample-and-hold circuit, thereby producing said output signal from said noise level detecting means.

9. A noise suppressing circuit as claimed in claim 7, wherein said noise level detecting circuit is arranged to receive said output signal from said first subtractor in said vertical correlation noise canceller.

10. A noise suppressing circuit as claimed in claim 7, further comprising a sync separator responsive to said noise-suppressed output video signal from said in-line noise suppressing circuit for separating a horizontal sync signal as said sync signal fed to said switching signal generating means.

11. A noise suppressing circuit as claimed in claim 7, further comprising a sync separator responsive to said noise-suppressed output video signal from said in-line noise suppressing circuit for separating a vertical sync signal as said sync signal fed to said switching signal generating means.

12. A noise suppressing circuit for a video signal, comprising:
(a) a switching signal generating means for generating a switching signal in response to a sync signal derived from the video signal;
(b) a first subtractor responsive to said video signal and an output signal of a coefficient setting circuit;
(c) a 1-H delay circuit responsive to an output signal from said first subtractor;
(d) a second subtractor responsive to an output signal from said 1-H delay circuit and to said video signal;
(e) a limiter responsive to an output signal from said second subtractor, an output signal of said limiter being fed to an input of said coefficient setting circuit;
(f) noise level detecting means responsive to said switching signal for detecting magnitude of noise included in said output signal from said second subtractor within blanking period;
(g) means for controlling magnitude of said output signal from said limiter in accordance with an output signal from said noise level detecting means; and
(h) a third subtractor responsive to an output signal from said magnitude controlling means and to said video signal for producing an output video signal.

13. A noise suppressing circuit as claimed in claim 12, wherein said noise level detecting means comprises a switching circuit for deriving noise components included in said video signal within said blanking period, a full-wave rectifying circuit for performing full-wave rectification of an output from said switching circuit, a sample-and-hold circuit for sampling and holding an output from said full-wave rectifying circuit and a low pass filter for smoothing an output from said sample-and-hold circuit, thereby producing said output signal from said noise level detecting means.

14. A noise suppressing circuit for a video signal, comprising:
(a) a switching signal generating means for generating a switching signal in response to a sync signal derived from the video signal;
(b) noise level detecting means responsive to said switching signal for detecting magnitude of noise included in said video signal within a blanking period;

(c) noise subtracting means including:
  (i) a vertical correlation noise canceller having a 1-H delay circuit responsive to said video signal, a first subtractor responsive to said video signal and to an output from said 1-H circuit, a first limiter responsive to an output signal from said first subtractor, and a second subtractor responsive to said video signal and to an output signal from said first limiter for obtaining first high frequency small-amplitude components of said video signal through detecting vertical correlation and for subtracting said first high frequency small-amplitude components from said video signal thereby producing a first noise-suppressed output video signal;
  (ii) an in-line noise suppressing circuit having a low pass filter, a third subtractor for subtracting the output of said low pass filter from said first noise-suppressed output video signal, and a second limiter coupled to said third subtractor, for obtaining a second high frequency small-amplitude component of said first noise-suppressed output video signal, and further having a fourth subtractor for subtracting said second high frequency small-amplitude component from said first noise-suppressed output video signal to produce a second noise-suppressed output video signal; and (d) means incorporated with said noise subtracting means for controlling magnitude of said first high frequency small-amplitude components in accordance with an output signal from said noise level detecting means before said first high frequency small-amplitude components are subtracted from said video signal thereby producing said first noise-suppressed output video signal.

15. A noise suppressing circuit as claimed in claim 14, further comprising a second means incorporated with said noise subtracting means for controlling magnitude of said second high frequency small-amplitude components in accordance with an output signal from said noise level detecting means before said second high frequency small-amplitude components are subtracted from said first noise-suppressed output video signal thereby producing said second noise-suppressed output video signal.

* * * * *